(12) United States Patent
Hu

(10) Patent No.: US 12,431,740 B1
(45) Date of Patent: Sep. 30, 2025

(54) WIRELESS POWER TRANSMISSION SYSTEMS FOR RESONANCE TRACKING THROUGH LOW-FREQUENCY PULSE CONTROL

(71) Applicant: NINGBO DOUCHPOWER TECHNOLOGY CO., LTD., Zhejiang (CN)

(72) Inventor: Jianghao Hu, Ningbo (CN)

(73) Assignee: NINGBO DOUCHPOWERTECHNOLOGY CO., LTD., Ningbo (CN)

( * ) Notice: Subject to any disclaimer, the term of this patent is extended or adjusted under 35 U.S.C. 154(b) by 0 days.

(21) Appl. No.: 19/228,735

(22) Filed: Jun. 4, 2025

Related U.S. Application Data

(63) Continuation of application No. PCT/CN2023/130334, filed on Nov. 8, 2023.

(30) Foreign Application Priority Data

Oct. 31, 2023 (CN) .......................... 202311445300.6

(51) Int. Cl.
H02J 50/12 (2016.01)
H02M 1/00 (2007.01)
(Continued)

(52) U.S. Cl.
CPC ........... *H02J 50/12* (2016.02); *H02M 1/0009* (2021.05); *H02M 7/5387* (2013.01); *H02M 7/5395* (2013.01)

(58) Field of Classification Search
CPC .... H02J 50/12; H02M 1/0009; H02M 7/5387; H02M 7/5395
See application file for complete search history.

(56) References Cited

U.S. PATENT DOCUMENTS 6,301,128 B1 10/2001 Jang et al.
8,410,790 B2 * 4/2013 Thiede ............... G01R 31/1227
324/547
(Continued)

FOREIGN PATENT DOCUMENTS

CN 104124774 A 10/2014
CN 106972646 A 7/2017
(Continued)

OTHER PUBLICATIONS

First Office Action in Chinese Application No. 202311445300.6 mailed on Jul. 25, 2024, 15 pages.
(Continued)

*Primary Examiner* — Rexford N Barnie
*Assistant Examiner* — Michael J Warmflash
(74) *Attorney, Agent, or Firm* — PORUS IP LLC

(57) ABSTRACT

The present disclosure belongs to the field of wireless power transmission technology, and specifically relates to a wireless power transmission system for resonance tracking through low-frequency pulse control. The system includes a power supply, a transmitting end, and a receiving end. The transmitting end includes a compensation circuit including a resonance capacitor and a transmitting coil that are connected in series with each other, the receiving end includes a receiving coil. The transmitting end also includes a bridge inverter. The wireless power transmission system completes resonance tracking through low-frequency pulse control of the bridge inverter, and realizes current self-oscillation through pulse charging of voltage. Compared with a conventional negative resistance self-oscillation manner, the present disclosure does not require additional complex negative resistance design and only needs to change an inverter control signal, so it has lower application cost and makes expansion of system function more flexible.

7 Claims, 11 Drawing Sheets

(51) Int. Cl.
*H02M 7/5387* (2007.01)
*H02M 7/5395* (2006.01)

(56) References Cited

U.S. PATENT DOCUMENTS

| | | | | |
|---|---|---|---|---|
| 9,583,970 | B2* | 2/2017 | Hsia | H02J 50/12 |
| 10,075,073 | B2* | 9/2018 | Guan | G05F 1/46 |
| 10,536,085 | B2* | 1/2020 | Hirano | H02M 1/08 |
| 2004/0218406 | A1 | 11/2004 | Jang et al. | |
| 2010/0259280 | A1* | 10/2010 | Thiede | G01R 31/1227 324/547 |
| 2016/0336783 | A1* | 11/2016 | Hsia | H02J 7/007 |
| 2017/0070149 | A1* | 3/2017 | Guan | H02M 1/36 |
| 2019/0222128 | A1* | 7/2019 | Hirano | H02M 3/33553 |
| 2021/0385912 | A1* | 12/2021 | Egenter | H05B 6/04 |
| 2023/0412061 | A1* | 12/2023 | Avestruz | H02M 1/0009 |

FOREIGN PATENT DOCUMENTS

| | | |
|---|---|---|
| CN | 110048496 A | 7/2019 |
| CN | 110146760 A | 8/2019 |
| CN | 110212655 A | 9/2019 |
| CN | 112671115 A | 4/2021 |
| CN | 115503515 A | 12/2022 |
| JP | 2021087343 A | 6/2021 |

OTHER PUBLICATIONS

Decision to Grant a Patent in Chinese Application No. 202311445300.6 mailed on Aug. 24, 2024, 4 pages.

Henry Kennedy et al., A Self-Tuning Resonant-Inductive-Link Transmit Driver Using Quadrature Symmetric Delay Trimmable Phase-Switched Fractional Capacitance, IEEE Journal of Solid-State Circuits, 53(6): 1694-1706, 2018.

Li, Hongchang et al., Pulse Density Modulation for Maximum Efficiency Point Tracking of Wireless Power Transfer Systems, IEEE Transactions On Power Electronics, 33(6): 5492-5501, 2018.

Hu, Jianghao et al., Low-Frequency Pulse Control for Self-Oscillation-Based Resonance Tracking of Wireless Power Transfer Systems, IEEE Transactions On Industrial Electronics, 71(9): 10591-10600, 2024.

International Search Report in PCT/CN2023/130334 mailed on Jul. 4, 2024, 5 pages.

\* cited by examiner and the inverter-based control provides more flexibility in expanding functionality. However, both of schemes essentially design a feedback control system to achieve the resonance tracking. As a resonance state of the WPT is volatile and difficult to detect, not only an accurate detection circuit is required to obtain the resonance information, but also a complex control algorithm is required to achieve the resonance tracking, which not only increases the cost but also creates a problem on a real-time and a robustness of the system.

WIRELESS POWER TRANSMISSION SYSTEMS FOR RESONANCE TRACKING THROUGH LOW-FREQUENCY PULSE CONTROL

CROSS-REFERENCE TO RELATED APPLICATION

This application is a continuation of International Application No. PCT/CN2023/130334, filed on Nov. 8, 2023, which claims priority of Chinese Patent Application No. 202311445300.6, filed on Oct. 31, 2023, the contents of each of which are entirely incorporated herein by reference.

TECHNICAL FIELD

The present disclosure belongs to the field of wireless power transmission technology, and specifically relates to a wireless power transmission system for resonance tracking through low-frequency pulse control.

BACKGROUND

Wireless power transmission (WPT) that transfers power through circuit resonance has advantages such as convenience and safety, which leads to widespread use and research.

A control of an inverter, as a basic function to accomplish an alternating current (AC)-direct current (DC) conversion, is a key research content in WPT. For example, a control technique for the inverter may include a basic pulse width modulation (PWM) power control technique, an impedance conversion control technique without DC/DC converter under a capacitive load using ON-OFF key modulation control, a pulse frequency modulation (PFM) technique utilizing a power density modulation to realize a power control under a soft switching, an inverter phase control technique realizing a wireless power beamforming based on a cross-antenna, etc.

The WPT uses resonance as a mode of energy transfer, which is used to increase a radio transmission efficiency. An accurate matching of a coil current frequency to the resonance frequency is a key to an effective operation of resonance, however, affected by factors such as a measurement accuracy, an ambient temperature, and a device tolerance, the resonance frequency of the WPT is variable, especially an impedance change caused by a charging distance variation. A deviation between an operation frequency and the resonance frequency may cause detuning, which increases a system reactive power loss and reduces the power efficiency of the system, therefore, resonance tracking is a research hotspot in the WPT.

Performing a feedback control by obtaining circuit resonance information is an intuitive scheme to realize the resonance tracking. Depending on a difference of objects, the feedback control scheme may be categorized into two types: an input frequency change and a resonance parameter switching. The parameter switching is mainly realized by controlling an array coil, an adjustable capacitor, etc. However, additional switching devices may bring about operation losses, and a discontinuity of the device parameters makes it difficult to realize an accurate resonance tracking, so the parameter switching manner does not have an advantage in terms of practicality and cost. In contrast to the parameter switching, the frequency change scheme tracks the resonance frequency by controlling an inverter frequency. The frequency change scheme provides better efficiency without adding additional components, and the inverter-based control provides more flexibility in expanding functionality. However, both of schemes essentially design a feedback control system to achieve the resonance tracking. As a resonance state of the WPT is volatile and difficult to detect, not only an accurate detection circuit is required to obtain the resonance information, but also a complex control algorithm is required to achieve the resonance tracking, which not only increases the cost but also creates a problem on a real-time and a robustness of the system.

The resonance in the WPT may be generated not only by an external periodic AC power drive, but also by self-oscillation. The resonance frequency of the circuit generated based on the self-oscillation is only related to internal resonance parameters. Compared to the feedback control scheme, the resonance tracking by self-oscillation does not require any resonance information feedback and algorithmic control, which has a lower cost and solves the problem in terms of the real-time and the robustness in the feedback control scheme. S. Assawaworrarit et al., proposed a parity asymmetric circuit in Nature to improve the robustness of the WPT, which essentially constructs a symmetric circuit through an equivalent negative resistance to realize a self-oscillation resonance tracking. In this way, although the self-oscillation resonance tracking has better robustness and real-time performance, a design of the negative resistance is very complex, which brings extra cost and reduces a redundancy of the system, and the complicated circuit structure also limits a system function expansion.

SUMMARY

In response to the technical problems in the prior art of constructing a symmetrical circuit to realize a self-oscillating resonance tracking by means of a negative resistance, which causes a high cost, reduces a redundancy of the system, and limits a system function expansion, the present disclosure provides a wireless power transmission system for resonance tracking through low-frequency pulse control.

In order to solve the foregoing technical problem, one aspect of the present disclosure provides the wireless power transmission system for resonance tracking through low-frequency pulse control including a power supply, a transmitting end, and a receiving end, wherein the transmitting end includes a compensation circuit including a resonance capacitor and a transmitting coil that are connected in series with each other, the receiving end includes a receiving coil. The transmitting end also includes a bridge inverter including: a first metal-oxide-semiconductor field-effect transistor (MOSFET), a drain of the first MOSFET is connected to a positive electrode of the power supply, a source of the first MOSFET is connected to an end of the resonance capacitor away from the transmitting coil, and a gate of the first MOSFET is a driving end.

In some embodiments, in the wireless power transmission system for resonance tracking through low-frequency pulse control as described hereinbefore, the first MOSFET and the second MOSFET are N-channel MOSFETs.

In some embodiments, in the wireless power transmission system for resonance tracking by low-frequency pulse control as described hereinbefore, when controlling the first MOSFET to be connected and the second MOSFET to be disconnected, the transmitting end is in a charging stage, and the transmitting end is connected to the power supply for charging; when controlling the first MOSFET to be disconnected and the second MOSFET to be connected, by continuously providing a low-frequency pulse control signal to the driving end of the second MOSFET, the second MOSFET is configured to output a low-frequency pulse voltage, the transmitting end forms the closed resonance loop and generates a self-oscillation, the transmitting coil generates an induced magnetic field, and the receiving coil at the receiving end obtains power through a magnetic induction phenomenon to realize a wireless power transmission.

In some embodiments, in the wireless power transmission system for resonance tracking by low-frequency pulse control as described hereinbefore, the relationships among the oscillation period $T_o$ and the pulse time $\tau$ and the control frequency $f_c$ of the low-frequency pulse control signal satisfy:

$$\tau = T_o/2$$
$$f_c = \frac{1}{(n+1)T_o}, n \in N_+$$

where, n≥1 and n∈Z+
a duty cycle D of the low-frequency pulse control signal satisfies:

$$D = \tau f_c = \frac{1}{2(n+1)}$$

In some embodiments, in the wireless power transmission system for resonance tracking by low-frequency pulse control as described hereinbefore, the wireless power transmission system for resonance tracking by low-frequency pulse control further includes a control circuit, the control circuit including: a controller respectively connected to the driving end of the first MOSFET and the driving end of the second MOSFET; and a measurement circuit, the measurement circuit being used to obtain an oscillation period of a closed resonance loop formed by the transmitting end, and an output end of the measurement circuit being connected to a signal input end of the controller. After initialization, through the controller, a fixed low-frequency pulse voltage is controlled to be output from the second MOSFET for resonance starting, and the controller obtains the oscillation period $T_o$ of the closed resonance loop through the measurement circuit, and adjusts, based on relationships among the oscillation period $T_o$, a pulse time $\tau$, and a control frequency $f_c$, the pulse time $\tau$ and the control frequency $f_c$ of the low-frequency pulse control signal.

In some embodiments, in the wireless power transmission system for resonance tracking by low-frequency pulse control as described hereinbefore, when the controller controls the second MOSFET to output the fixed low-frequency pulse voltage for resonance starting, control parameters of the low-frequency pulse control signal satisfy: the control frequency $f_c$=40 Khz, the duty cycle D=10%, and the pulse time $\tau$=10% of $T_c$, where $T_c$ denotes a charging period.

In some embodiments, in the wireless power transmission system for resonance tracking by low-frequency pulse control as described hereinbefore, when the control circuit adjusts the pulse time $\tau$ and the control frequency $f_c$ of the low-frequency pulse control signal based on the relationships among the oscillation period $T_o$, the pulse time $\tau$, and the control frequency $f_c$, n takes a value of 1, the control frequency $f_c$ is half of the oscillation period $T_o$, and the duty cycle D is fixed at 25%.

In some embodiments, in the wireless power transmission system for resonance tracking by low-frequency pulse control as previously described, the measurement circuit adopts a zero current detection circuit.

Positive progressive effect of the present disclosure is following. 1. The wireless power transmission system of the present disclosure accomplishes the resonance tracking by low-frequency pulse control of the inverter, and realizes the self-oscillation of the current by the pulse charging of the voltage. Compared to a conventional negative resistance self-oscillation manner, instead of requiring an additional complex negative resistance design, the present disclosure only needs to change an inverter control signal to realize the self-oscillation, which results in a more lower application cost, and no additional circuit is required to make the expansion of system function more flexible. 2. The control circuit for resonance tracking of the present disclosure has an extended function of realizing a soft switching in a full working range. Compared to a conventional WPT with a fixed control frequency, the present disclosure has higher efficiency as well as power gain under a strong coupling.

BRIEF DESCRIPTION OF THE DRAWINGS

The present disclosure will be clearer with reference to the drawings. It should be understood that these drawings are for illustration only, and are not intended to limit the scope of protection of the present disclosure, wherein:

FIG. 10(*b*) is a diagram illustrating test waveforms of a coil resonance voltage and a control signal under pulse control with a duty cycle of 25% when operating;

DETAILED DESCRIPTION

To following illustrates an embodiment of the present disclosure by way of particular specific examples, and other advantages and efficacies of the present disclosure may be readily appreciated by those skilled in the art from the contents of the present disclosure. The present disclosure may be implemented or applied in various other specific embodiments, and the details in the present disclosure may be modified or changed based on different points of view and applications without departing from the spirit of the present disclosure.

It is to be noted that the following embodiments and features in the embodiments may be combined with each other without conflict.

In the description of the present disclosure, it is to be clarified that, with respect to the words of orientation, such as the terms "outside," "middle," "inner," "outer," etc. indicating an orientation and positional relationship based on the orientation or positional relationship shown in the accompanying drawings, it is only for the convenience of reciting the present disclosure and simplifying the description, and not to indicate or imply that the device or element referred to has to have a specific orientation, or be constructed and operated in a specific orientation, which cannot be construed as limiting the specific scope of protection of the present disclosure.

Additionally, the terms "first" and "second," if any, are used only for descriptive purposes and are not to be construed as indicating or implying relative importance or implicitly specifying a number of technical features. Thereby, the limitation that a "first" or "second" feature may expressly or impliedly include one or more of the technical features, and in the description of the present disclosure, "several" or "a plurality of" means two or more, unless otherwise expressly and specifically limited.

Embodiments of the present disclosure provide a wireless power transmission system for resonance tracking through low-frequency pulse control, including a power supply $U_{IN}$, a transmitting end, and a receiving end. The transmitting end includes a compensation circuit including a resonance capacitor $C_P$ and a transmitting coil $L_P$ that are connected in series with each other. A compensation circuit at the receiving end includes a resonance capacitor $C_S$ and a receiving coil $L_S$ that are connected in parallel with each other. The receiving coil $L_S$ and the transmitting coil $L_P$ generate a magnetic field coupling to realize a wireless power transmission.

Figure 1:
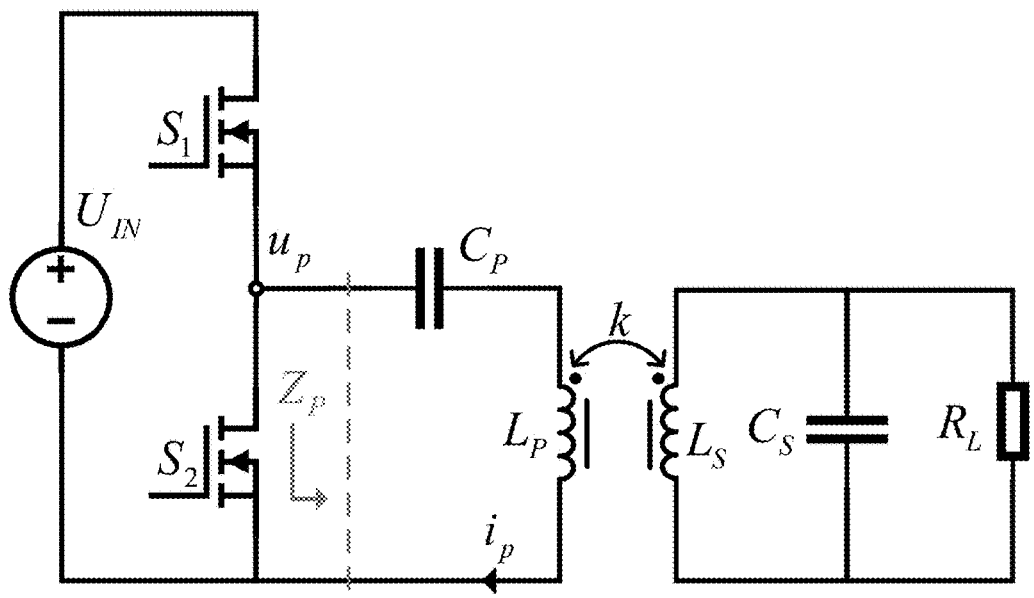
FIG. 1(a) is a schematic diagram illustrating a wireless power transmission system for resonance tracking through a low-frequency pulse control signal according to the present disclosure.
FIG. 1(b) is a schematic diagram illustrating a ratio of $w_r$ to $w_{LC}$ for different coupling degrees.
Figure 1:
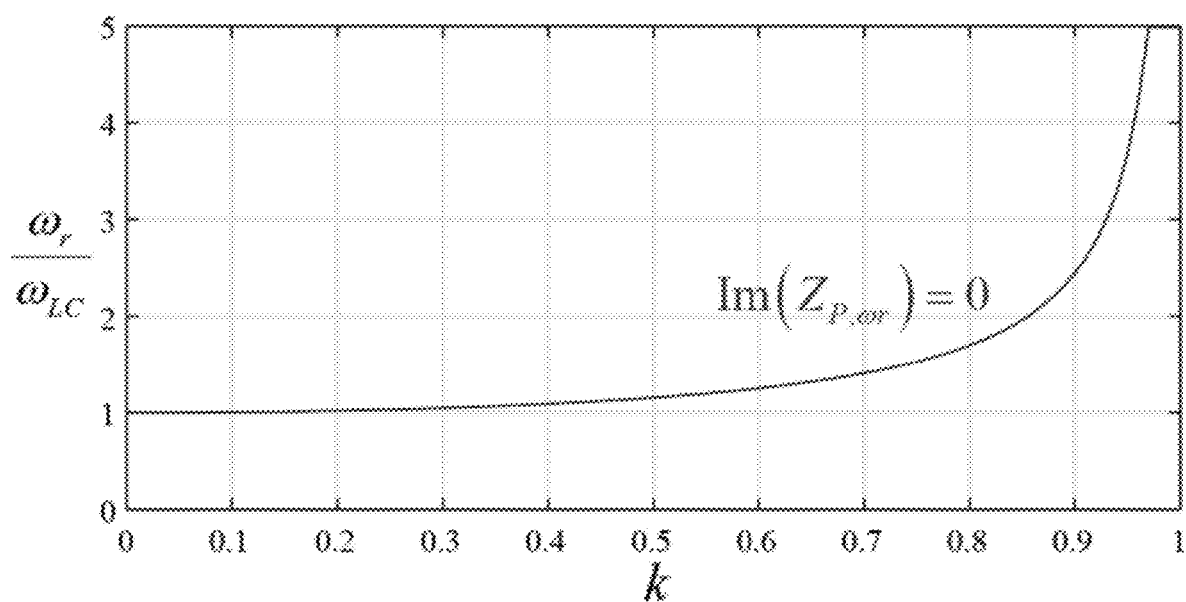

Referring to FIG. 1(*a*), the transmitting end also includes a bridge inverter, and the bridge inverter includes a first metal-oxide-semiconductor field-effect transistor (MOSFET) S1 and a second MOSFET S2.

A drain of the first MOSFET S1 is connected to a positive electrode of the power supply $U_{IN}$, a source of the first MOSFET S1 is connected to an end of the resonance capacitor $C_P$ away from the transmitting coil $L_P$, and a gate of the first MOSFET S1 is a driving end of the first MOSFET S1.

A source of the second MOSFET S2 is connected to a negative electrode of the power supply $U_{IN}$ and an end of the transmitting coil $L_P$ away from the resonance capacitor $C_P$, respectively, a drain of the second MOSFET S2 is connected to the source of the first MOSFET S1, and a gate of the second MOSFET S2 is a driving end of the second MOSFET S2.

The wireless power transmission system of the present disclosure utilizes a compensation circuit in a form of a series-parallel (SP) at the transmitting end as a basic topology of wireless power transmission (WPT). The compensation circuit at the transmitting end is a series structure (the resonance capacitor $C_P$ and the transmitting coil $L_P$ connected in series with each other), and the compensation circuit at the receiving end is a parallel structure (the resonance capacitor $C_S$ and the receiving coil $L_S$ connected in parallel with each other). An imaginary portion of a reflected impedance of the SP compensation circuit is variable at different mutual inductances, which causes a resonance frequency $f_r$ of the compensation circuit to be variable at different charging distances. In the present disclosure, the bridge inverter cooperates with the SP compensation circuit in the wireless power transmission system, and the bridge inverter is preferably a half-bridge inverter. As shown in FIG. 1(*a*), the power supply $U_{IN}$ inputs a DC voltage to the bridge inverter (the half-bridge inverter shown in the figure), where k denotes a coupling factor, $u_P$ and $i_P$ respectively denote an output voltage and current of the bridge inverter, and $Z_P$ denotes an equivalent output reactance of the bridge inverter. The first MOSFET S1 and the second MOSFET S2, as a switching device, form upper and lower bridge arms of the half-bridge inverter. The first MOSFET S1 is the upper bridge arm of the half-bridge inverter and the second MOSFET S2 is the lower bridge arm of the half-bridge inverter. $L_P$ denotes the transmitting coil at the transmitting end, $C_P$ denotes the resonance capacitor at the transmitting end, and the transmitting coil $L_P$ is connected in series with the resonance capacitor $C_P$. $L_S$ denotes the receiving coil at the receiving end, $C_S$ denotes a receiving capacitor at the receiving end, and the receiving coil $L_S$ is connected in parallel with the resonance capacitor $C_S$, where $L_P * C_P = L_S * C_S$.

The output reactance $Z_P$ of the half-bridge inverter of the WPT includes a loop reactance $$Z_{TX}\left(Z_{TX} = j\omega L_P + \frac{1}{j\omega C_P}\right)$$

at the transmitting end and a reflected impedance $Z_{ref}$ at the receiving end, as shown in the following mathematical Formular (1), the output reactance $Z_P$ may show inductive, capacitive, and resistive properties:

$$Z_P = j\omega L_P + \frac{1}{j\omega C_P} + Z_{ref} \qquad (1)$$

For a series-series (SS) compensated WPT circuit (i.e., the compensation circuit at the transmitting end and the compensation circuit at the receiving end in the WPT circuit are both in series structures), the imaginary portion of $Z_{ref}$ of the SS compensation circuit at a parametric angular frequency $w_{LC}$ ($w_{LC}=1/\sqrt{L_P C_P}$) is always zero, so that a resonance angular frequency of the SS compensation circuit at different coupling factors k is $w_r=w_{LC}$. Different from the SS compensation circuit, the imaginary portion $\text{Im}(Z_{ref})$ of $Z_{ref}$ of the SP compensation circuit is not zero under $w_{LC}$, which has the following values:

$$\text{Im}(Z_{ref,\omega_{LC}}) = -\frac{\omega_{LC} M^2}{L_S} \neq 0 \quad (2)$$

Formular (2) indicates that the reflected impedance $Z_{ref}$ of the SP compensation circuit under $w_{LC}$ is capacitive and the imaginary portion becomes greater with an increase of a mutual inductance M, which increases a circuit reactive power loss and thus deteriorates an operating condition of the inverter. Increasing an operating frequency makes the loop reactance $Z_{TX}$ at the transmitting end inductive, thus compensating for the capacitive reactance (the reflected impedance $Z_{ref}$), the relationship may be expressed in the following formular:

$$\underbrace{\left| j\omega_r L_P + \frac{1}{j\omega_r C_P} \right|}_{z_{TX,\omega r}} = \underbrace{\left| \frac{-\omega_r^3 M^2 \left[ C_S R_L^2 (\omega_r^2 L_S C_S - 1) + L_S \right]}{R_L^2 (\omega_r^2 L_S C_S - 1)^2 + \omega_r^2 L_S^2} \right|}_{\text{Im}(Z_{ref,\omega r})} \quad (3)$$

Based on the Formular (3), the resonance angular frequency $w_r$ is obtained, which makes an imaginary portion $\text{Im}(Z_P)$ of $Z_P$ to be zero. Comparing the resonance angular frequency $w_r$ with the parametric angular frequency $w_{LC}$ at different coupling factors k yields a change curve shown in FIG. 1(b). From FIG. 1(b), it may be seen that as the coupling factor k increases, the $w_r$ increases, which is due to a fact that the increasing of $\text{Im}(Z_{ref})$ results in a requirement for a higher inductive reactance (e.g., the loop reactance $Z_{TX}$) at the transmitting end for compensating the capacitive reactance (e.g., the reflected impedance $Z_{ref}$); whereas, as k decreases, the $w_r$ is closer to $w_{LC}$, which is due to a decrease of an impact of $\text{Im}(Z_{ref})$ at a low coupling factor. As obtaining of k and a solution of Formular (3) are very troublesome, the conventional feedback control scheme needs to obtain a great amount of information and complex operations to realize the resonance tracking, which raises the cost and leads to a difficulty for the system in terms of a real-time and a robustness.

The resonance, as a circuit phenomenon, may be generated not only by an alternating current modulated by an external feedback control system, but also by self-oscillation. The resonance generated by self-oscillation is not affected by external perturbations, and is only related to internal resonance parameters, and the resonance does not have any delay, so it solves the problem of the conventional feedback control scheme in terms of robustness and real-time with a lower cost.

The present disclosure therefore employs a design that realizes the self-oscillation only through a low-frequency pulse control of the inverter, which uses a voltage pulse charging to realize the current self-oscillation.

Figure 2:
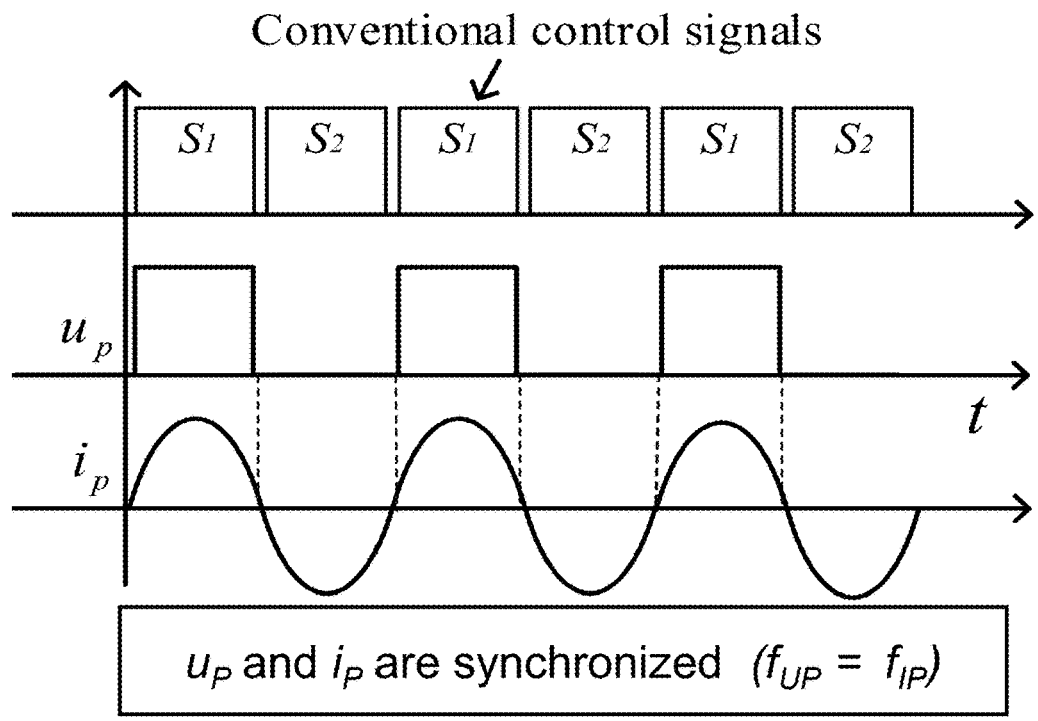
FIG. 2(a) is a schematic diagram illustrating an ideal waveform of an output voltage up and a current $i_P$ of a bridge inverter corresponding to a conventional control signal.
FIG. 2(b) is a schematic diagram illustrating an ideal waveform of an output voltage $u_P$ and a current $i_P$ of a bridge inverter corresponding to a low-frequency pulse control signal according to the present disclosure.
Figure 2:
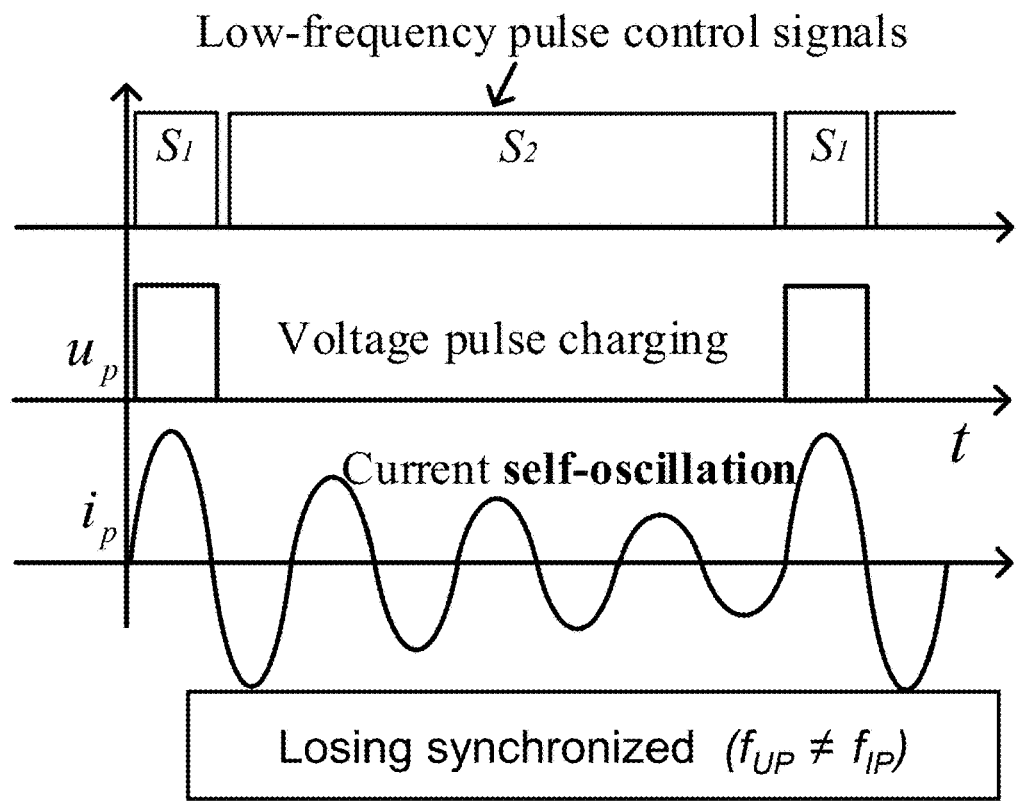

FIG. 2(a) is a schematic diagram illustrating an ideal waveform of an output voltage $u_P$ and a current $i_P$ of a bridge inverter corresponding to a conventional control signal. As shown in FIG. 2(a), when a control signal of the bridge inverter is a conventional control signal, a waveform of $u_P$ is only determined by the control signal, while a waveform of $i_P$ is jointly determined by $u_P$ and an inverter output load. As an equivalent load (a resonance load) of WPT is an inductor and a capacitor connected in series, a DC isolation feature of the load allows the $i_P$ to be an AC with a periodical and symmetrical change. When $u_P$ changes and is symmetrical in one resonance cycle, $u_P$ matches a feature of the resonance load, and $u_P$ is synchronized with $i_P$, i.e., a control frequency $f_{UP}$ of the bridge inverter and a system operating frequency $f_{IP}$ are equal under the conventional signal.

FIG. 2(b) is a schematic diagram illustrating an ideal waveform of an output voltage $u_P$ and a current $i_P$ of a bridge inverter corresponding to a low-frequency pulse control signal according to the present disclosure. As shown in FIG. 2(b), when the control signal of the bridge inverter is the low-frequency pulse signal, $u_P$ does not change in one resonance period. However, $i_P$ does not stop changing due to an impact of the resonance load, and then $u_P$ and $i_P$ are desynchronized, i.e., the control frequency $f_{UP}$ of the bridge inverter is unequal to a system operating frequency $f_{IP}$ under the low-frequency pulse control signal ($f_{UP} \neq f_{IP}$). After losing synchronization with up, $i_P$ undergoes a self-oscillation, at which point the system operating frequency is determined only by the resonance parameters. Therefore, the system operating frequency under the low-frequency pulse control signal proposed in the present disclosure is able to automatically track the resonance frequency.

In some embodiments, the first MOSFET S1, the second MOSFET S2 are N-channel MOSFETs.

Figure 3:
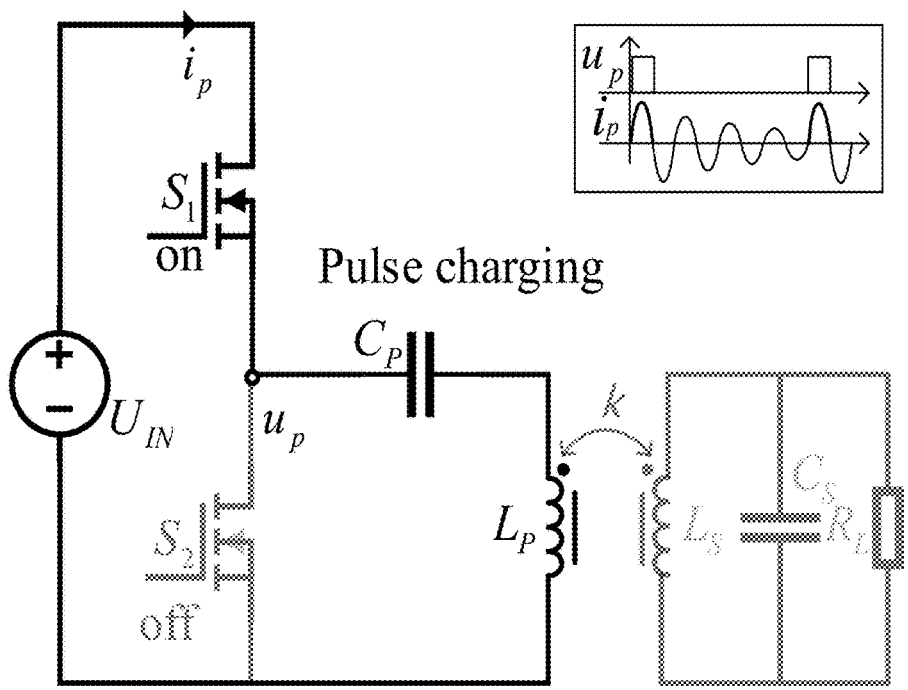
FIG. 3(a) is a schematic diagram illustrating a circuit of a wireless power transmission system in a voltage pulse charging stage according to the present disclosure.
FIG. 3(b) is a schematic diagram illustrating a circuit of a wireless power transmission system in a current self-oscillation stage according to the present disclosure.
Figure 3:
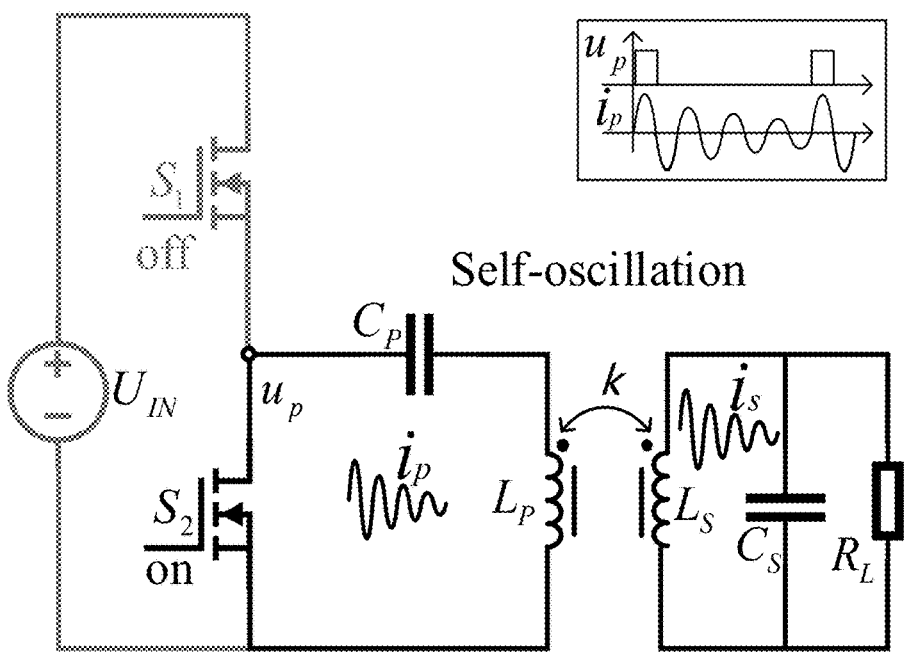

In some embodiments, as shown in FIGS. 3(a) and 3(b), which are schematic diagrams illustrating a circuit operation when the bridge inverter control signal is the low-frequency pulse signal. In this case, a voltage pulse charging stage is shown in FIG. 3(a) and a current self-oscillation stage is shown in FIG. 3(b).

Referring to FIG. 3(a), when the first MOSFET S1 is controlled to be connected and the second MOSFET S2 is disconnected, the transmitting end is in an energizing stage (i.e., a charging stage), and the transmitting end is connected to the power supply $U_{IN}$ for charging. In this stage, the low-frequency pulse control signal is provided to the driving end of the first MOSFET S1 (that is, the gate of the first MOSFET S1), causing the first MOSFET S1 to output a low-frequency pulse voltage to realize the voltage pulse charging. An input power of the system is related to a state of a resonance portion, when the resonance is at a negative voltage peak, a voltage difference between the power supply and a resonance end is the greatest, then the input power (i.e., an input energy) is maximized, and when the resonance is at a positive voltage peak, then the input power is the smallest.

Referring to FIG. 3(b), when the first MOSFET S1 is disconnected and the second MOSFET S2 is connected, the low-frequency pulse control signal is continuously supplied to the driving end (i.e., the gate) of the second MOSFET S2, causing the second MOSFET S2 to output the low-frequency pulse voltage, so that a closed resonance loop is formed at the transmitting end and the transmitting end generates the self-oscillation, and an induced magnetic field is generated by the transmitting coil $L_P$, and at the receiving end, the receiving coil $L_S$ magnetically coupled with the transmitting coil $L_P$ utilizes a magnetic induction phenomenon to obtain energy, thereby realizing wireless power transmission. In this stage, as the low-frequency pulse control signal does not change in one resonance period, the $i_P$ does not stop changing when affected by the resonance load, then the $i_P$ oscillates freely at the transmitting end and generates an induced magnetic field on the transmitting coil LP thus transmitting energy to the load. Whether or not an oscillation angular frequency $w_o$ of the $i_P$ is equal to the resonance angular frequency $w_r$ is a key to establishment of the design theory of the present disclosure, and the relationship between the oscillation angular frequency $w_o$ and the resonance angular frequency $w_r$ is solved by a distributed circuit charging oscillation model.

A loop voltage formular for the transmitting end in FIG. 3(b) may be written according to Kirchhoff's law as follows:

$$-u_{C_P} + u_{R_P} + u_{L'_P} = 0 \quad (4)$$

where $R_P$ denotes an equivalent resonance resistance ($R_P = \text{Re}(Z_{ref})$) and $L'_P$ denotes an equivalent resonance inductance formed by LP and $\text{Im}(Z_{ref})$. Parameters in the above Formular (4) may be expressed as:

$$\begin{cases} u_{C_P} = -\dfrac{1}{C_P} \int i_P dt \\ u_R = R_P i_P = -R_P C_P \dfrac{du_{C_P}}{dt} \\ u_{L'} = L'_P \dfrac{di_P}{dt} = -L'_P C_P \dfrac{d^2 u_{C_P}}{dt^2} \end{cases} \quad (5)$$

The above Formular (5) is substituted into Formular (4), and the following second order linear constant factor differential Formular (6) may be obtained:

$$L'_P C_P \frac{d^2 u_{C_P}}{dt^2} + R_P C_P \frac{du_{C_P}}{dt} + u_{C_P} = 0 \quad (6)$$

Formular (6) above is solved, $u_{C_P}$ may be obtained as:

$$u_{C_P} = A_1 e^{p_1 t} + A_2 e^{p_2 t} \quad (7)$$

where $A_1$ and $A_2$ are constants. P is a characteristic root of the following mathematical Formular (8):
where $$p_{1,2} = -\frac{R_P}{2L'_P} \pm \sqrt{\left(\frac{R_P}{2L'_P}\right)^2 - \frac{1}{L'_P C_P}} = -\sigma \pm \omega_r \sqrt{\frac{1}{(4Q^2)} - 1} \quad (8)$$

$$\omega_r = \sqrt{\frac{1}{L'_P C_P}}, \; Q = \frac{1}{R_P}\sqrt{\frac{L'_P}{C_P}}, \; \sigma = \frac{R_P}{2L'_P}$$

Formular (8) above is analyzed, which shows that $u_{C_P}$ has two unequal negative real roots when Q<0.5, and at this time, the circuit decays exponentially and does not have an oscillatory feature. When Q>0.5, $u_{C_P}$ is formed by a pair of conjugate complex roots, which is expressed by combining the conjugate complex roots as follows:

$$u_{C_P} = U_{P,M} e^{-\sigma t} \sin\left(\omega_r t \sqrt{1 - \frac{1}{4Q^2}}\right) \quad (9)$$

where $U_{P,M}$ denotes an initial oscillating voltage, which is also a maximum instantaneous voltage when the system is operating.

Substituting Formular (5) into Formular (9), and $i_P$ in the oscillation stage is obtained:

$$i_p = I_{PM} e^{-\sigma t} \sin\left(\omega_r t \sqrt{1 - \frac{1}{4Q^2}} + \beta\right) \quad (10)$$

To this point, the relationship between the oscillation frequency $w_o$ and $w_r$ may be extracted as follows:

$$\omega_o = \omega_r \sqrt{1 - 1/(4Q^2)} \approx \omega_r, \text{ for } Q \gg 0.5 \quad (11)$$

In WPT, the power is usually transmitted by coil magnetic induction, and to ensure a transmission capacity, it is necessary to make |L|>>|C|, so, in Formular (11), Q>>0.5. To this point the present disclosure has theoretically verified that $w_o = w_r$, which supports a theoretical feasibility of the present disclosure. Also, as the self-oscillation is a spontaneous response state, a resonance end current continues to oscillate throughout an entire operating period (including the charging period). Compared with the manner of constructing a symmetric circuit with negative resistance to realize the self-oscillating resonance tracking, the self-oscillating realized by the low-frequency pulse control of the present disclosure is more advantageous in terms of a cost and a system flexibility.

In some embodiments, relationships among the oscillation period $T_o$ and the pulse time $\tau$ and the control frequency $f_c$ of the low-frequency pulse control signal are:

$$\tau = T_o/2 \quad (12)$$

$$f_c = \frac{1}{(n+1)T_o}, \; n \in N_+ \quad (13)$$

where n≥1, n∈Z$^+$

Then, a duty cycle D of the low-frequency pulse control signal is:

$$D = \tau f_c = \frac{1}{2(n+1)} \quad (14)$$

The bridge inverter outputs the low-frequency pulse voltage that is able to directly realize the resonance tracking, however, a difference of control parameters affects the operation of the bridge inverter. The control parameters of the low-frequency pulse control signal of the present disclosure are the pulse time $\tau$ and the control frequency $f_c$, respectively, and a relationship of the pulse time $\tau$ and the control frequency $f_c$ to the oscillation period $T_o$ determines a switching moment of the switching transistors (e.g., the first MOSFET and the second MOSFET) in the operation of the circuit, which greatly affects a switching loss of the bridge inverter.

Figure 4:
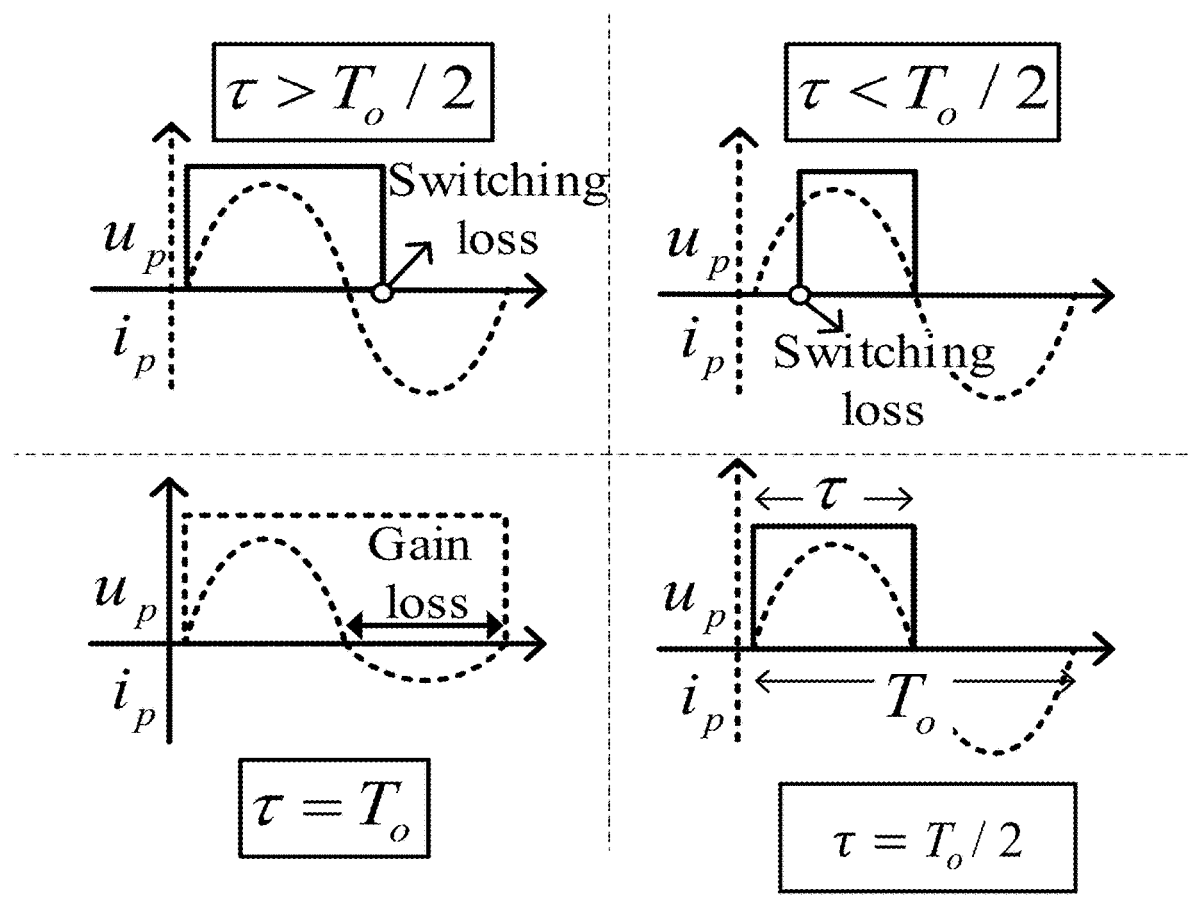
FIG. 4 is a diagram illustrating waveforms for different relationships between $\tau$ and $T_o$.

Referring to FIG. 4, waveforms of $u_P$ and $i_P$ are shown under the four different relationships between the pulse time (a pulse width) $\tau$ and the oscillation period $T_o$.

As shown in FIG. 4, when $\tau > T_o/2$ or $\tau < T_o/2$, phases of $u_P$ and $i_P$ are inconsistent, and then a switching action of the first MOSFET S1 and the second MOSFET S2 may not be accomplished at zero current, which results in the switching loss and reduces efficiency.

As shown in FIG. 4, when $\tau = T_o$, the resonance end of the $i_P$ is still connected to the power supply at a negative half-period, which causes the current to charge in a reverse direction and thus reduces a power transmission capability of the system.

As shown in FIG. 4, when $\tau=T_o/2$, $u_P$ completes the pulse charging in a positive half-circle of the $i_P$, and switching of the switching action of the first MOSFET S1 and the second MOSFET S2 is accomplished at the zero current, at this time, the system is at an optimal working condition, and the bridge inverter has the maximum output power and the lowest switching loss.

Similar to the analysis of $\tau$, for a single control charging period $T_c$ of the system ($f_c=1/T_c$), $T_c$ has to be an integer multiple of $T_o$ to ensure the same phase between $u_P$ and $i_P$. At the same time, to ensure that the current is able to oscillate in full during a non-charging time, $T_c$ has to be twice of $T_o$.

Therefore, the control parameters of the optimal low-frequency pulse control signal may be summarized as Formulars (12) and (13).

Formular (14) shows that the duty cycle D of the optimal control parameter of the low-frequency pulse control signal has a specific value not greater than 25%, and is only related to the power, a control design process of the present disclosure is greatly simplified.

In some embodiments, in the self-oscillation of the current, n is 1, the control frequency $f_c$ is half of the oscillation period $T_o$, and the duty cycle D is fixed at 25%.

Figure 5:
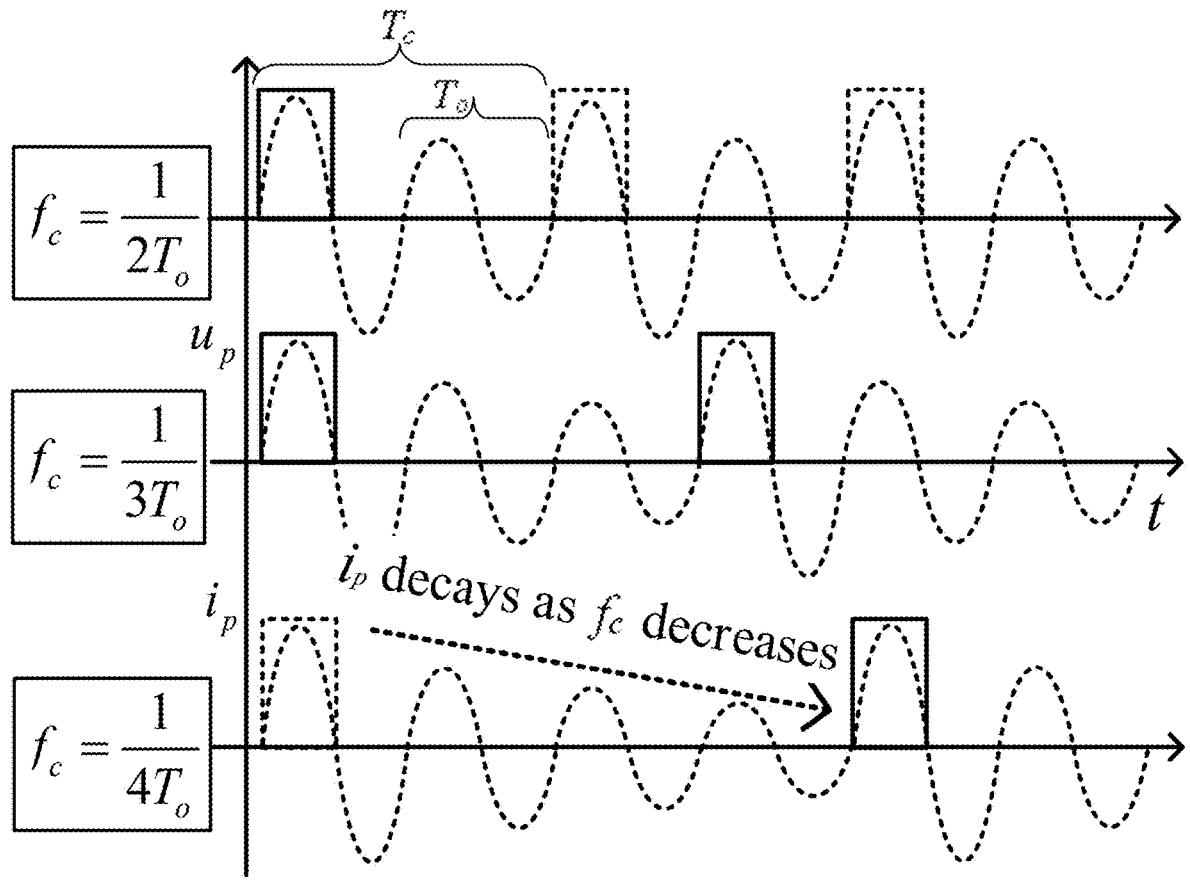
FIG. 5 is a diagram illustrating a waveform for $i_P$ changes at different control frequencies $f_c$ according to the present disclosure.

For the proportion factor n of the control frequency $f_c$ in Formular (13), the greater the n, the longer an oscillation time of a single charging period $T_c$. Through Formular (10), it may be seen that $i_P$ in the oscillation stage is decreasing exponentially with $e^{-\sigma t}$, so the greater the n, the smaller an average current of the $i_P$, and the lower the output power of the system, which is also visualized on FIG. 5. Thus, a power control based on a low-frequency pulse signal system may be realized by controlling n.

To guarantee the output power as well as to simplify a control process, n is preferred to be the minimum value, i.e., n=1. At this point, according to Formulars (13) and (14), the control frequency $f_c$ is half of the oscillation period $T_o$, and the duty cycle D is fixed at 25%.

The present disclosure also analyzes and simulates circuit features under different control parameters. A time domain expression of $u_P$ under the low-frequency pulse control in one control period may be written as follows.

$$u_P = \begin{cases} U_{IN} & (0 < t \le \tau) \\ 0 & (\tau < t \le T_c) \end{cases} \quad (15)$$

Through an exponential Fourier transform, $u_P$ in a frequency domain may be obtained as:

$$u_P = \sum_{n=-\infty}^{\infty} F_n e^{jn\omega t} = U_{IN} \frac{\tau}{T_c} \sum_{n=-\infty}^{\infty} Sa\left(\frac{n\omega\tau}{2}\right) e^{jn\omega t} \quad (16)$$

where Sa denotes a sampling function, while an spectral spectrum of $u_P$ is distributed roughly according to a shape of the sampling function.

When $\tau=T_o/2$, $u_P$ is a conventional symmetric square wave signal (D=50%) with a Fourier expansion of:

$$u_{P,50\%D} = \frac{4}{\pi} U_{IN} \sum_{n=1,3,5}^{\infty} \frac{1}{n} \sin(n\omega t) \quad (17)$$

After obtaining a mathematical expression corresponding to the low-frequency pulse control signal, an output power formular of the system may be obtained as follows, which is similar to the manner of calculating the conventional WPT:

$$P_{out} = \frac{u_P^2 \omega^2 M^2 R_L}{\left|(Z_{TX} Z_{RX} + \omega^2 M^2)^2 (\omega C_S R_L - j)^2\right|} \quad (18)$$

where $Z_{RX}$ denotes a loop impedance of the receiving end. The resonance end efficiency $\eta_Q$ may be obtained by comparing the output power $P_{out}$ and a real portion of a power $S_P$ ($S_P=u_P^2/Z_P$), which is mainly affected by a resonance end quality factor. An efficiency of a system inverter, $\eta_{inv}$, is mainly affected by the switching loss, which is related to several factors. Relevant inverter efficiency formular is obtained by testing different input phase angle ($S_P$) and performing a data fit. To this point the system efficiency $\eta_{sys}$ may be written as follows:

$$\eta_{sys}=\eta_Q \eta_{inv} \quad (19)$$

where $\eta_Q=P_{OUT}/Re(S_P)$ and $\eta_{inv}=f[ang(S_P)]$.

After obtaining the simulation formular for the output power and the efficiency of the system, the relevant experimental verifications may be performed, which optimizes a design process of the system and improves a model accuracy.

Figure 6:
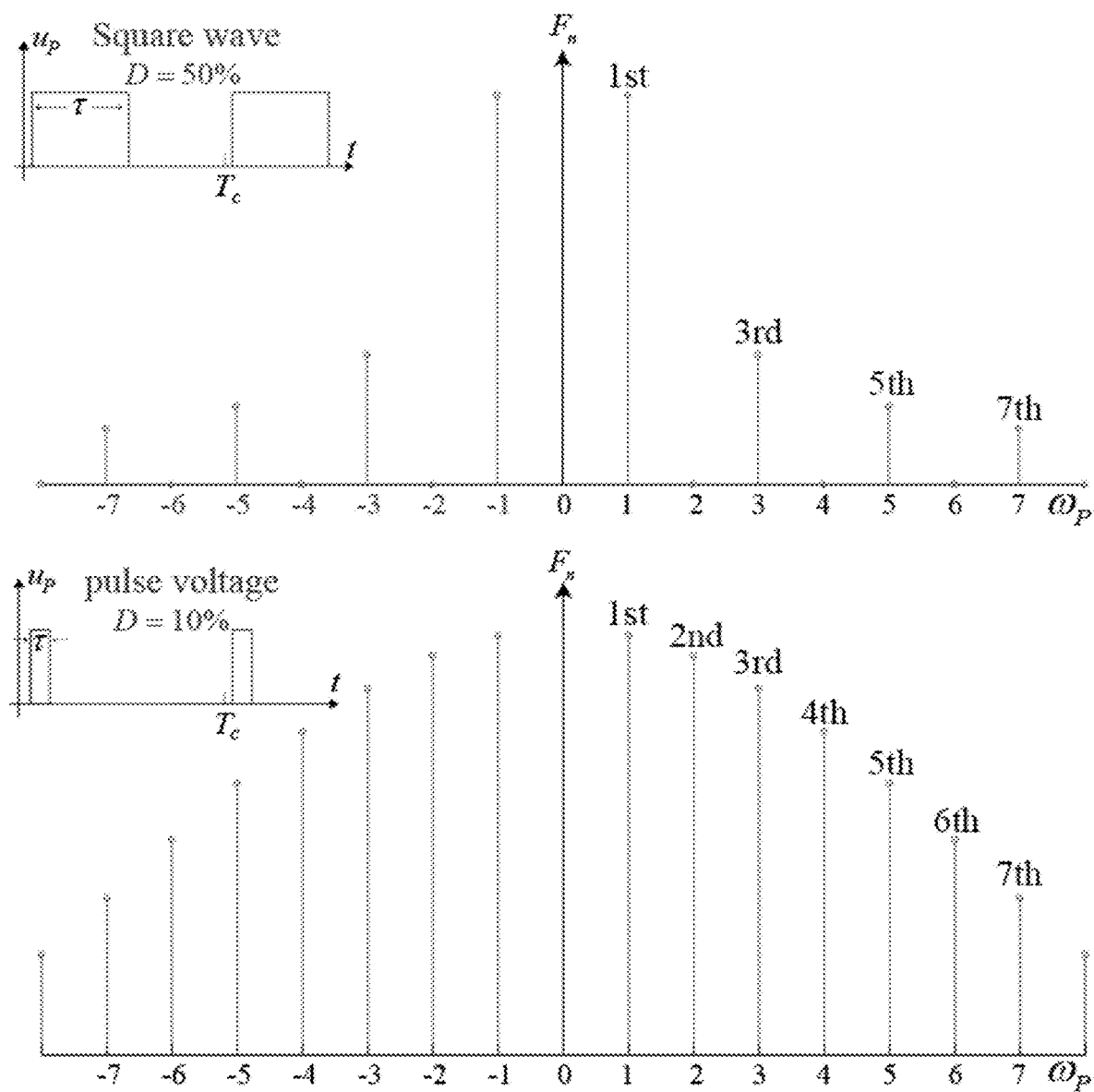
FIG. 6 is a schematic diagram illustrating bilateral spectrums of $u_P$ under a conventional square wave signal and a low-frequency pulse signal.
Figure 7:
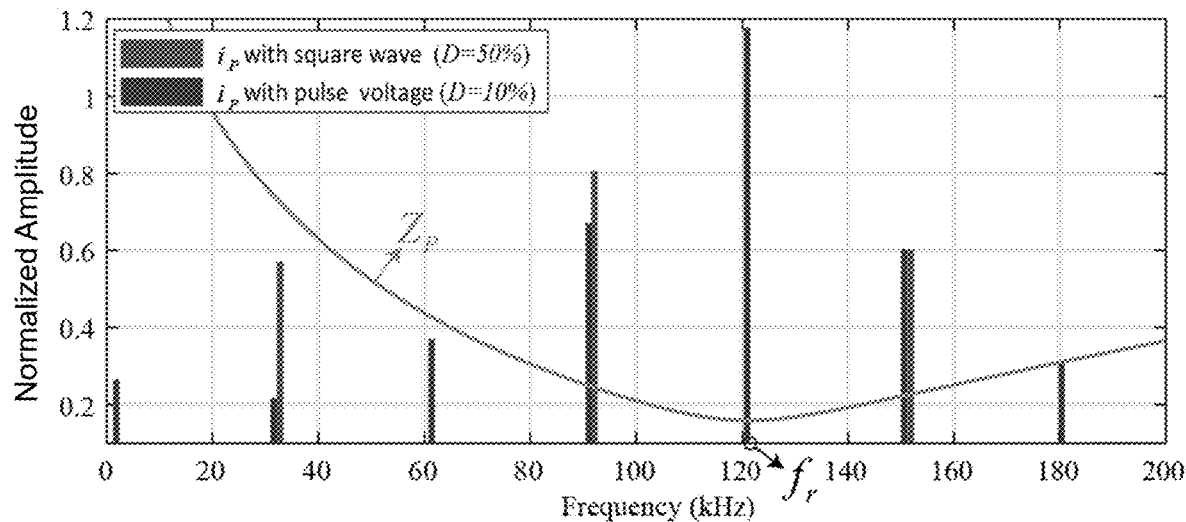
FIG. 7 is a normalized curve illustrating a spectrum of $i_P$ and a normalized curve of $Z_P$ under a conventional square wave signal and a low-frequency pulse signal.

Formular (18) shows a conventional square wave signal without even harmonics, which limits a frequency conversion of the signal at high frequencies. Form Formulars (16) and (17), bilateral spectrums of $u_P$ under a conventional square wave signal (D=50%) and a pulsed signal (D=10%) as shown in FIG. 6 are obtained. The figure clearly shows that the pulse signal has a great count of both odd and even harmonics compared to the conventional square wave signal that has only rapidly falling odd harmonics. As $Z_P$ may be interpreted as an inductance, capacitance, resistance (LCR) filter with a frequency-selective feature, these abundant high-frequency components are loaded on $Z_P$ with the frequency-selective feature, which enhances a current component near $w_r$ and translates into a required current with the resonance frequency and achieves a self-oscillating resonance tracking. FIG. 7 further shows the process graphically, where both $i_P$ and $Z_P$ are normalized.

Figure 8:
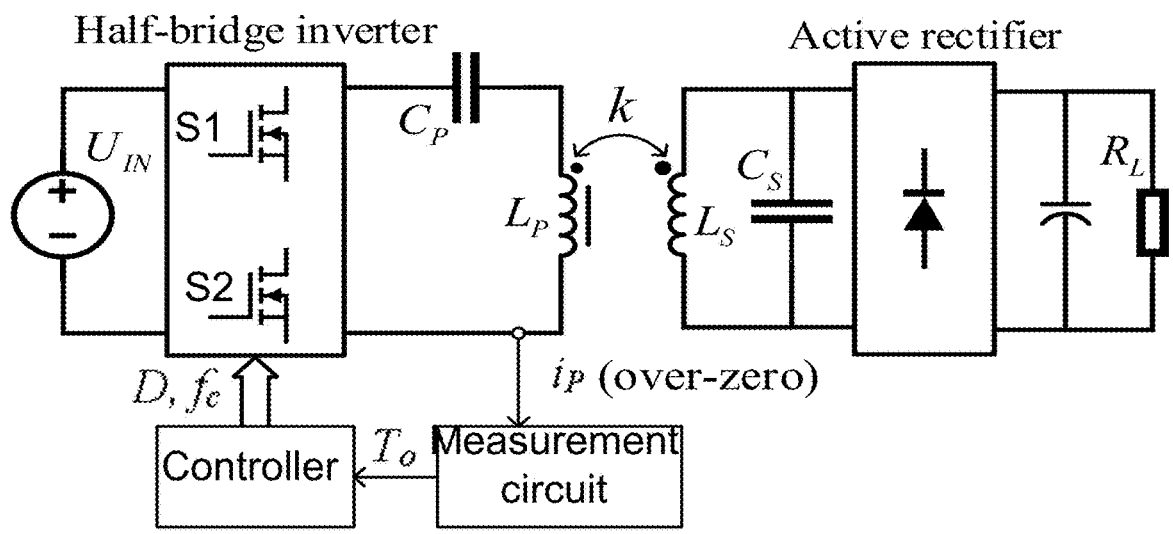
FIG. 8 is a schematic diagram illustrating a circuit of another wireless power transmission system for resonance tracking through a low-frequency pulse control signal according to the present disclosure.
Figure 9:
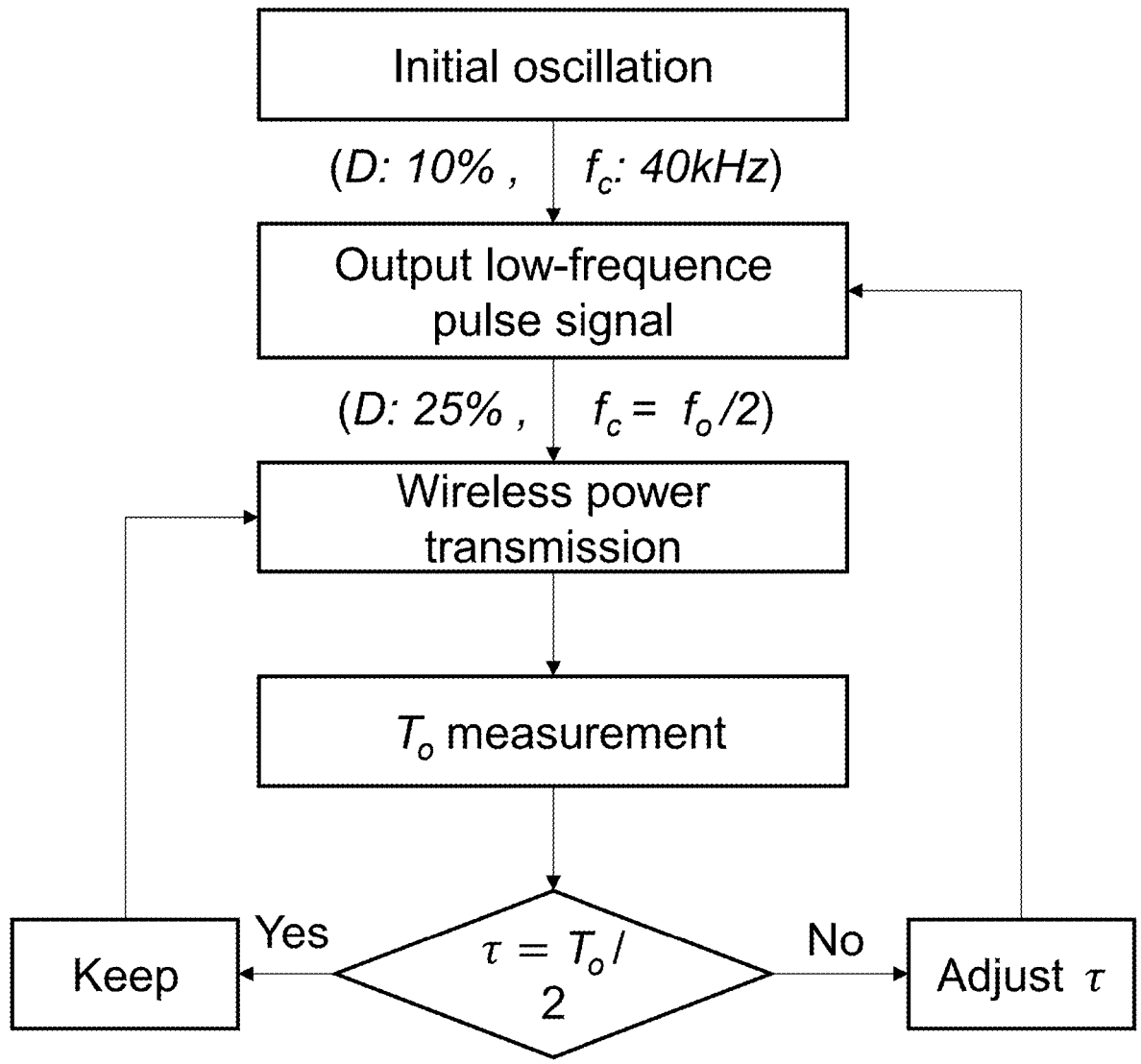
FIG. 9 is a flowchart illustrating a control process of a wireless power transmission system for resonance tracking through a low-frequency pulse control signal according to the present disclosure.

In some embodiments, referring to FIGS. 8 and 9, the wireless power transmission system for resonance tracking through low-frequency pulse control further includes a control circuit including a controller and a measurement circuit.

The controller is connected to the driving end of the first MOSFET S1 and the driving end of the second MOSFET S2, respectively. The controller is used to provide the low-frequency pulse control signal to the first MOSFET S1 and the second MOSFET S2. For example, in the charging stage, the low-frequency pulse control signal is provided to the driving end of the first MOSFET S1 through the controller, so that the first MOSFET S1 outputs a low-frequency pulse voltage to realize the voltage pulse charging; in the current self-oscillation stage, the low-frequency pulse control signal is continuously provided to the driving end of the second MOSFET through the controller, so that the second MOSFET outputs the low-frequency pulse voltage, and the transmitting end forms a closed resonance loop and generates the self-oscillation. The measurement circuit is used to obtain the oscillation period of the closed resonance loop formed at the transmitting end. The output end of the measurement circuit is connected to a signal input end of the controller, which sends the obtained oscillation period to the controller so that the controller adjusts the pulse time τ and control frequency $f_c$ of the low-frequency pulse control signal based on the relationships among the oscillation period, and the pulse time τ, and the control frequency $f_c$.

While the use of low-frequency pulse control signal is able to directly realize the self-oscillating resonance tracking without the need for detecting resonance information and feedback control, the oscillation frequency under different charging distances changes, and a fixed low-frequency pulse control parameter is unable to realize a soft-switching operation in a full operating range. Therefore, the present embodiment designs a low-frequency pulse control system with an additional soft switching function, as shown in FIG. 8, and the low-frequency pulse control system may be used for realizing full-range soft-switching and resonance tracking with an unknown coupling factor and a variable load. The low-frequency pulse control system includes a control circuit including the measurement circuit for obtaining the oscillation period $T_o$ and the controller for outputting the low-frequency pulse control signal. The control circuit, together with the power supply $U_{IN}$, the transmitting end, and the receiving end, forms the wireless power transmission system for resonance tracking through low-frequency pulse control provided in the present disclosure.

The control process corresponding to the wireless power transmission system shown in FIG. 8 is shown in FIG. 9. Specifically, after the system is initialized, the controller controls the bridge inverter to output a fixed low-frequency pulse voltage for the WPT circuit to resonance starting. For example, combining with FIG. 8, when controlling the first MOSFET S1 of the bridge inverter to be disconnected and the second MOSFET S2 of the bridge inverter to be connected, the controller makes the second MOSFET S2 to output the low-frequency pulse voltage for resonance starting by providing the low-frequency pulse control signal to the driving end of the second MOSFET S2. After the bridge inverter outputs the initial low-frequency pulse voltage signal, the circuit performs the self-oscillation. For example, combining with FIG. 8, after the low-frequency pulse voltage is output from the second MOSFET S2, a closed resonance loop is formed at the transmitting end (e.g., as shown in FIG. 3(b), a closed resonance loop is formed by the second MOSFET S2, resonance capacitor CP, and transmitting end coil LP that are connected in series), and the self-oscillation is generated. After generating the self-oscillation, the controller may extract the oscillation period $T_o$ of the closed resonance loop through the measurement circuit and adjust τ to half of $T_o$ according to the relationship Formular (12) between the oscillation period $T_o$ and the pulse time τ to realize the soft-switching operation. The power control of the system may be realized by adjusting n of Formular (13). Specifically, the controller may adjust the value of n according to the relationship Formular (13) between the oscillation period $T_o$ and the control frequency $f_c$, for example, n takes the value of 1, so that the control frequency $f_c$ is half of the oscillation period $T_o$, thereby realizing the power control.

In some embodiments, when the bridge inverter is controlled by the controller to output a fixed low-frequency pulse voltage for resonance starting (e.g., the second MOSFET is controlled to output a fixed low-frequency pulse voltage for resonance starting), i.e., during an initial oscillation stage, the control parameters of the low-frequency pulse control signal are as follows: the control frequency $f_c$ is 40 Khz, the duty cycle D is 10%, and the pulse time τ is 10% of the charging period $T_c$. That is, initial signal parameters corresponding to the initial oscillation stage are D=10%, $f_c$=40 kHz, and τ=10% of Tc.

In some embodiments, to ensure the output power as well as to simplify the control process, when adjusting the pulse time τ and the control frequency $f_c$ of the low-frequency pulse control signal by the controller, i.e., after initialization (after resonance starting), n takes the value of 1, so that the control frequency $f_c$ is half of the oscillation period $T_o$, and the duty cycle D is fixed at 25%. That is, after initialization, parameters of the corresponding operating signal are D=25%, $f_c$=½$f_o$.

In some embodiments, there are various measurement schemes for the oscillation period $T_o$, and any one of the measurement circuits in the prior art may be used, for example, the measurement circuit in this embodiment uses a zero crossing current detection circuit.

The zero crossing current detection circuit outputs a square waveform signal with a $T_o$ time through a current sampling resistor and a zero crossing voltage comparator, then measures the square waveform signal by a counter of the controller.

Embodiment 1

A circuit and a control manner of the wireless power transmission system for resonance tracking by low-frequency pulse control adopts the control circuit of FIG. 1(a) combined with FIG. 8, and the control manner of FIG. 9, and system parameters are shown in Table 1 below:

TABLE 1

| $L_P$ | $C_P$ | $r_P$ | $U_{IN}$ | D (initial) | MOSFET |
|---|---|---|---|---|---|
| 23 uH | 47 nF | 0.3 | 20 V | 10% | C2M0080 |
| $L_S$ | $C_S$ | $r_S$ | $R_L$ | $f_c$ (initial) | MCU |
| 24 uH | 44 nF | 0.4 | 6 | 40 kHz | STM32G474 |

In Table 1, $r_P$ and $r_S$ are not shown in the figure. $r_P$ is taken as an equivalent resistance to be connected in series with the transmitting coil $L_P$, and likewise, $r_S$ is taken as a receiving resistance to be connected in series with the receiving coil $L_S$. The MOSFETs are the first MOSFET S1 and the second MOSFET S2.

The transmitting coil utilizes Qi standard coils, and a back of the receiving coil does not utilize ferrite to prevent a ferrite interaction that increases a self-inductance within a close distance.

A specification of the controller is a microprogrammed control unit (MCU) of STM32G474, and the measurement circuit uses INA214 as a current sampling chip and LM293 as a voltage comparator. A rectifying circuit at the receiving end adopts an active bridge rectifying scheme, and the rest of the design is similar to that of the conventional WPT.

Figure 10:
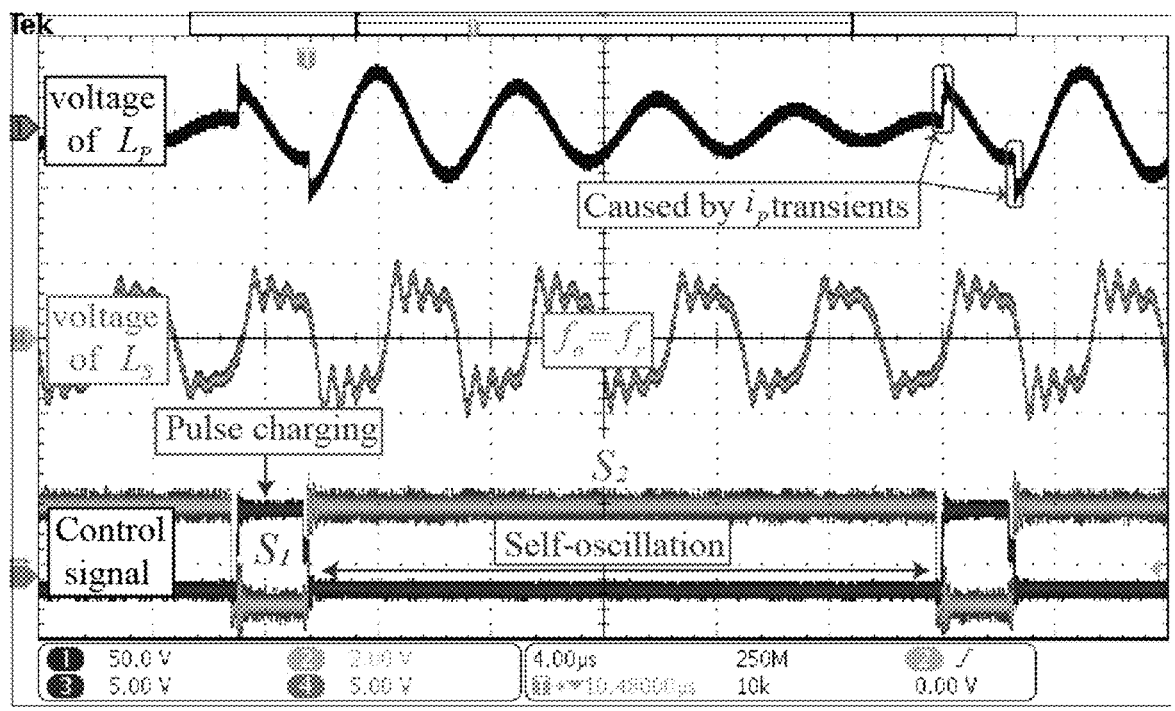
FIG. 10(*a*) is a diagram illustrating test waveforms of a coil resonance voltage and a control signal under pulse control with an initial duty cycle of 10%.
Figure 10:
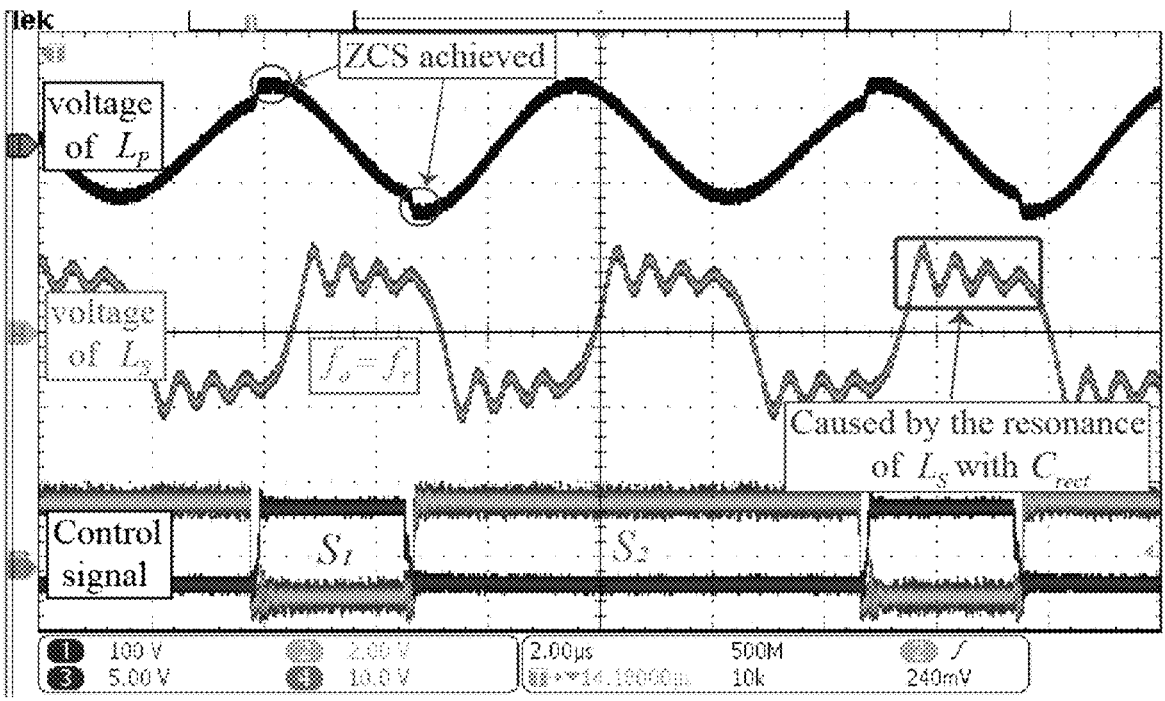

FIGS. 10(a) and 10(b) are experimental waveforms of a resonance voltage and a control signal under a coil charging spacing of 5 mm, where FIG. 10(a) and FIG. 10(b) correspond to an initial signal (D=10%, $f_c$=40 kHz) and an operating signal (D=25%, $f_c$=½$f_o$), respectively. From the comparison of the two diagrams shown in FIG. 10(a) and FIG. 10(b), it may be seen that a voltage on $L_P$ has a high peak due to a transient change of $i_P$ under the initial signal. On the contrary, under an operating pulse, the $L_P$ voltage is very smooth at a switching moment due to a realization of a zero current switching (ZCS) of the switching devices (the first MOSFET S1 and the second MOSFET S2). When noted that the voltage on the $L_S$ has a certain oscillation, and after frequency analysis, it is found that the oscillation happens due to an oscillation of the receiving coil $L_S$ and a rectifier pF level capacitance $C_{rect}$, whose impact on the efficiency and power of the system can be ignored. By measuring the oscillation frequencies of the receiving coil $L_S$ under two control signals (the initial signal and the operating signal), it may be that the oscillation frequencies are the same. It verifies that the self-oscillatory resonance tracking may be achieved by the low-frequency pulse control signal with any parameter.

Figure 11:
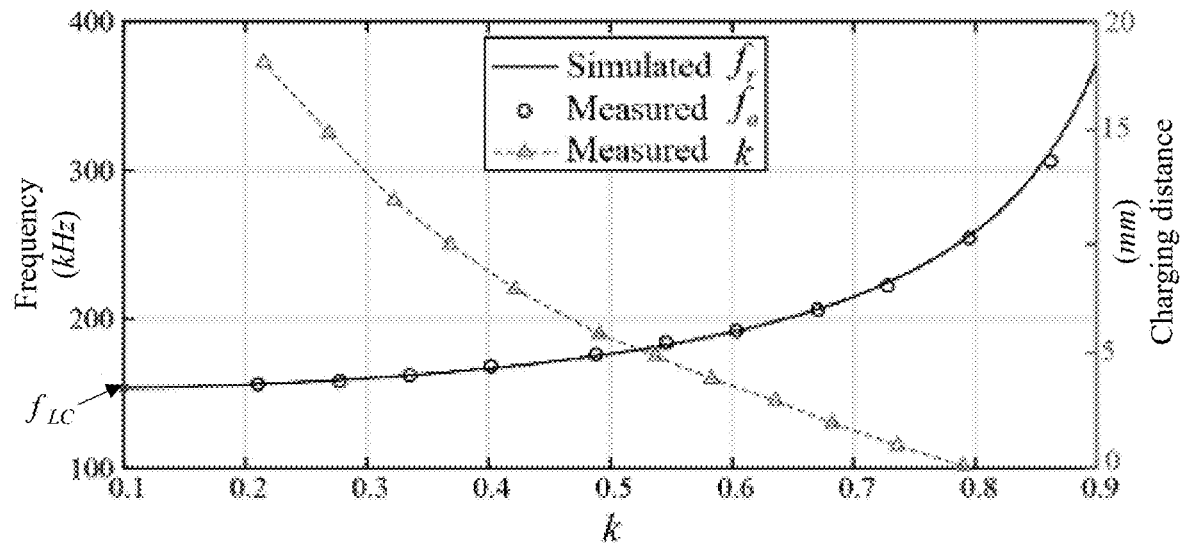
FIG. 11 is a schematic diagram illustrating a relationship between a coupling factor and an oscillation frequency under different charging distances.

FIG. 11 shows a test result of the coupling factor k and the oscillation frequency $f_o$ under different charging distances. As a spectrum at the receiving end is clearer than a spectrum at the transmitting end, a test object of the oscillation frequency $f_o$ is the receiving coil to improve the measurement accuracy. The resonance frequency $f_r$ of the system is also simulated in FIG. 11 by Formular (3), and by comparing the resonance frequency $f_r$ and the oscillation frequency $f_o$, it is found that a difference between the two is within 1%, which also verifies the accuracy of the low-frequency pulse control in realizing the resonance tracking. The test found that as k decreased, the oscillation frequency $f_o$ was closer to $f_{LC}$, which is consistent with the analysis in FIG. 1(b).

Figure 12:
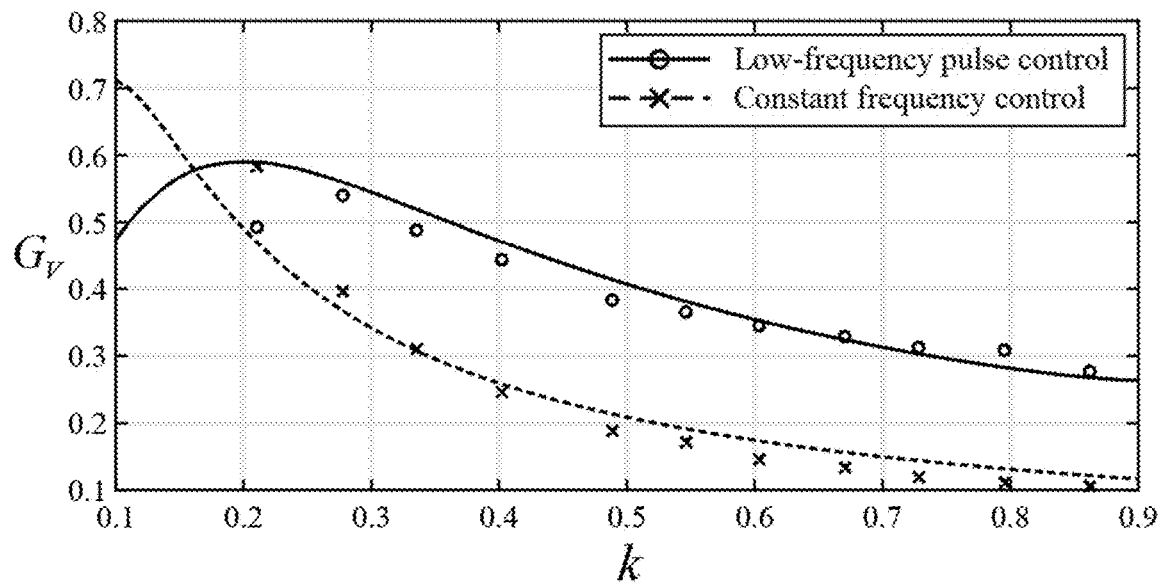
FIG. 12 is a schematic diagram comparing power transmission abilities of a conventional wireless power transmission system based on fixed frequency control and a wireless power transmission system based on low-frequency pulse control.

This embodiment also tests an output power capability and the efficiency under two systems, namely, the conventional wireless power transmission system based on fixed frequency control (conventional control signal: $f=f_{LC}$, D=50%) and the wireless power transmission system based on low-frequency pulse control proposed herein (low-frequency pulse control signal: $f=f_o/2$, D=25%). The test and simulation results of a voltage gain $G_V$ ($G_V=U_{OUT}/U_{IN}$) for the different systems are shown in FIG. 12, where Formular (18) is used for simulation. From FIG. 12, it may be found that the voltage gain of the conventional control signal is lower than the $G_V$ of the low-frequency pulsed control signal at a strong coupling (k>0.3), which is due to a fact that Im $(Z_P,w_{LC})$ is too great at the strong coupling and reduces the active power of the system. In contrast, Im $(Z_P,w_{LC})$ becomes smaller under a weak coupling (k<0.3) and the lower duty cycle of the low-frequency pulse control signal makes its equivalent input voltage smaller than the equivalent input voltage of the conventional signal, which results in the GV of the low-frequency pulse control signal of the present disclosure being smaller under the weak coupling as compared to the conventional control signal. A change rule of the power simulation result is the same as the test result.

Figure 13:
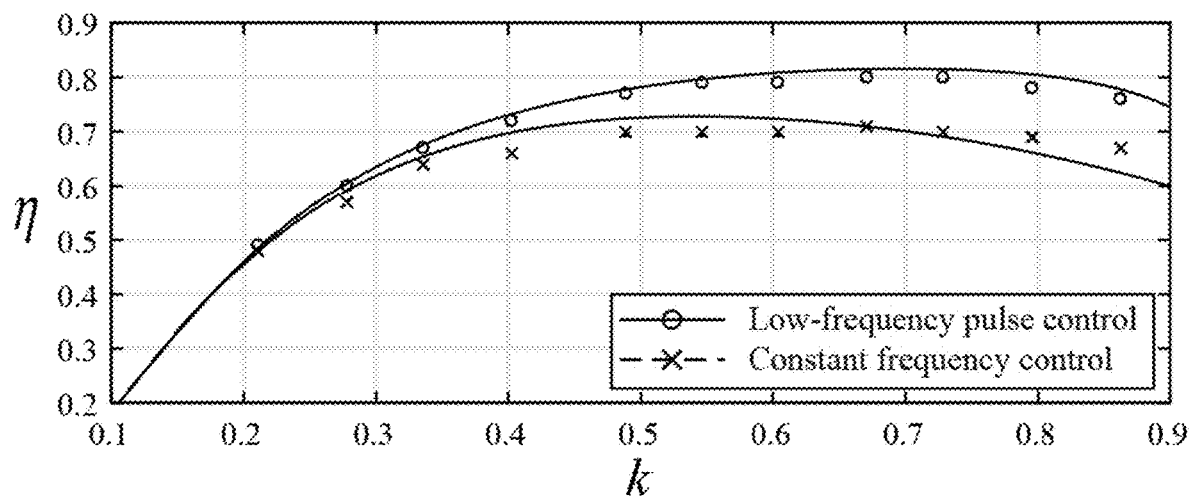
FIG. 13 is a schematic diagram comparing efficiencies of a conventional wireless power transmission system based on fixed frequency control and a wireless power transmission system based on low-frequency pulse control.

The efficiencies under the conventional system based on fixed frequency control and the system based on low-frequency pulse control are shown in FIG. 13, where the simulation on the figure is based on Formular (19), and high frequency loss was added to the simulation for an accurate simulation. From FIG. 13, it may be seen that the efficiency based on the low-frequency pulse control is higher than the efficiency of the conventional fixed frequency control under the strong coupling, which verifies the effectiveness of the wireless power transmission system in the present disclosure for resonance tracking through low-frequency pulse control in resonance tracking and efficiency optimization. While under the weak coupling, the improvement in efficiency based on the low-frequency pulse control is not significant due to a low resonance deviation. It is shown on FIG. 13 that the efficiencies of both the conventional system based on fixed frequency control and the system based on low-frequency pulse control decrease under very strong coupling (k>0.8). $f_r$ under the very strong coupling (k>0.8) is very high ($f_r$>250 kHz), and the high frequency reduces the equivalent reactance of $C_S$ and thus reduces the active power on a parallel load. Therefore, under the very strong coupling, there may be a power loss when realizing resonant high frequency operation based on the low-frequency pulse control. For the system based on fixed frequency control, an excessively high deviation of $f_{LC}$ from $f_r$ under the very strong coupling increases the system reactive power and thus increases an inverter loss.

In summary, the present embodiment experimentally verifies that the wireless power transmission system for resonance tracking through low-frequency pulse control has superior system features under the strong coupling than the conventional wireless power transmission system for resonance tracking based on the fixed frequency. The effectiveness of the present disclosure is demonstrated.

The present disclosure is described in detail above in conjunction with the embodiments of the accompanying drawings, and those skilled in the art may make various changes of the present disclosure in accordance with the above description. As such, certain details in the embodiments shall not constitute a limitation of the present disclosure, which are protected by the scope defined by the appended claims.

What is claimed is:

1. A wireless power transmission system for resonance tracking through low-frequency pulse control, comprising a power supply, a transmitting end, and a receiving end, wherein the transmitting end includes a compensation circuit including a resonance capacitor and a transmitting coil that are connected in series with each other, the receiving end includes a receiving coil; wherein the transmitting end also includes a bridge inverter including:
a first metal-oxide-semiconductor field-effect transistor (MOSFET), wherein a drain of the first MOSFET is connected to a positive electrode of the power supply, a source of the first MOSFET is connected to an end of the resonance capacitor away from the transmitting coil, and a gate of the first MOSFET is a driving end; and
a second MOSFET, wherein a source of the second MOSFET is respectively connected to a negative electrode of the power supply and an end of the transmitting coil away from the resonance capacitor, a drain of the second MOSFET is connected to the source of the first MOSFET, and a gate of the second MOSFET is another driving end; and the wireless power transmission system further comprises a control circuit, the control circuit including:
a controller respectively connected to the driving end of the first MOSFET and the driving end of the second MOSFET; and
a measurement circuit, wherein an output end of the measurement circuit is connected to a signal input end of the controller, the measurement circuit being used to obtain an oscillation period $T_o$ of a closed resonance loop formed by the transmitting end; wherein
when controlling the first MOSFET to be connected and the second MOSFET to be disconnected, the transmitting end is in a charging stage, and the transmitting end is connected to the power supply for charging;
when controlling the first MOSFET to be disconnected and the second MOSFET to be connected, by continuously providing a low-frequency pulse control signal to the driving end of the second MOSFET, the second MOSFET is configured to output a low-frequency pulse voltage, the transmitting end forms the closed resonance loop and generates a self-oscillation, the transmitting coil generates an induced magnetic field, and the receiving coil at the receiving end obtains power through a magnetic induction phenomenon to realize a wireless power transmission; and after initialization, through the controller, a fixed low-frequency pulse voltage is controlled to be output from the second MOSFET for resonance starting, and the controller obtains the oscillation period $T_o$ of the closed resonance loop through the measurement circuit, and adjusts, based on relationships among the oscillation period $T_o$, a pulse time $\tau$, and a control frequency $f_c$, the pulse time $\tau$ and the control frequency $f_c$ of the low-frequency pulse control signal.

2. The wireless transmission system of claim 1, wherein the first MOSFET and the second MOSFET are N-channel MOSFETs.

3. The wireless power transmission system of claim 1, wherein the relationships among the oscillation period $T_o$ and the pulse time $\tau$ and the control frequency $f_c$ of the low-frequency pulse control signal satisfy:

$$\tau = T_o/2$$
$$f_c = \frac{1}{(n+1)T_o}, n \in N_+$$

where, n≥1 and n∈Z⁺.

4. The wireless power transmission system of claim 3, wherein a duty cycle D of the low-frequency pulse control signal satisfies:

$$D = \tau f_c = \frac{1}{2(n+1)}.$$

5. The wireless power transmission system of claim 4, wherein when the control circuit adjusts the pulse time $\tau$ and the control frequency $f_c$ of the low-frequency pulse control signal based on the relationships among the oscillation period $T_o$, the pulse time $\tau$, and the control frequency $f_c$, n takes a value of 1, the control frequency $f_c$ is half of the oscillation period $T_o$, and the duty cycle D is fixed at 25%.

6. The wireless power transmission system of claim 1, wherein the measurement circuit adopts a zero crossing current detection circuit.

7. The wireless power transmission system of claim 4, wherein when the controller controls the second MOSFET to output the fixed low-frequency pulse voltage for resonance starting, control parameters of the low-frequency pulse control signal satisfy:

the control frequency $f_c$=40 Khz, the duty cycle D=10%, and the pulse time $\tau$=10% of $T_c$, where $T_c$ denotes a charging period.

* * * * *